(12) United States Patent
Luo et al.

(10) Patent No.: US 11,290,173 B2
(45) Date of Patent: Mar. 29, 2022

(54) RADIO LINK MONITORING METHOD AND APPARATUS

(71) Applicant: Huawei Technologies Co., Ltd., Shenzhen (CN)

(72) Inventors: Jun Luo, Kista (SE); Yinghao Jin, Shanghai (CN); Jin Liu, Shenzhen (CN); Zhengzheng Xiang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 170 days.

(21) Appl. No.: 16/713,914

(22) Filed: Dec. 13, 2019

(65) Prior Publication Data

US 2020/0145091 A1 May 7, 2020

Related U.S. Application Data

(63) Continuation of application No. PCT/CN2018/091234, filed on Jun. 14, 2018.

(30) Foreign Application Priority Data

Jun. 16, 2017 (CN) .......................... 201710459721.2

(51) Int. Cl.
*H04B 7/08* (2006.01)
*H04B 7/06* (2006.01)
(Continued)

(52) U.S. Cl.
CPC ........... *H04B 7/088* (2013.01); *H04B 7/0626* (2013.01); *H04L 5/0051* (2013.01); *H04W 24/10* (2013.01);
(Continued)

(58) Field of Classification Search
CPC ..... H04B 7/088; H04B 7/0626; H04L 5/0051; H04W 24/10; H04W 72/046; H04W 80/08; H04W 56/001
See application file for complete search history.

(56) References Cited

U.S. PATENT DOCUMENTS 10,542,445 B2 * 1/2020 Yoon .................. H04W 72/042
2014/0153545 A1 * 6/2014 Dimou ................ H04W 36/30
370/332
(Continued)

FOREIGN PATENT DOCUMENTS

CN 105519166 A 4/2016
CN 106793058 A 5/2017
(Continued)

OTHER PUBLICATIONS

Qualcomm Incorporated, "Considerations of RLM/RLF and beam recovery in NR", 3GPP TSG-RAN WG2 Meeting #98 R2-1705089, May 15-19, 2017, 4 pages, Hangzhou, China.
(Continued)

*Primary Examiner* — Deepa Belur
(74) *Attorney, Agent, or Firm* — Slater Matsil, LLP

(57) ABSTRACT

Embodiments of this application disclose a radio link monitoring method and apparatus, and relate to the field of communications technologies. The method may include: receiving, by a higher layer of a terminal, a beam detection result message from a lower layer of the terminal, where the beam detection result message is used to indicate a result of beam monitoring; and controlling, by the higher layer of the terminal, a radio link monitoring procedure based on the beam detection result message.

10 Claims, 14 Drawing Sheets

(51) Int. Cl.
*H04L 5/00* (2006.01)
*H04W 24/10* (2009.01)
*H04W 56/00* (2009.01)
*H04W 72/04* (2009.01)
*H04W 80/08* (2009.01)

(52) U.S. Cl.
CPC ....... *H04W 56/001* (2013.01); *H04W 72/046* (2013.01); *H04W 80/08* (2013.01)

(56) References Cited

U.S. PATENT DOCUMENTS

| | | | |
|---|---|---|---|
| 2016/0353510 A1* | 12/2016 | Zhang | H04L 43/16 |
| 2018/0332511 A1* | 11/2018 | Fan | H04W 36/0094 |
| 2019/0289535 A1* | 9/2019 | Lu | H04W 24/10 |
| 2021/0028984 A1* | 1/2021 | Da Silva | H04W 24/08 |

FOREIGN PATENT DOCUMENTS

| | | |
|---|---|---|
| JP | 2019537385 A | 12/2019 |
| JP | 2020516141 A | 5/2020 |
| JP | 2020520579 A | 7/2020 |
| WO | 2014110813 A1 | 7/2014 |
| WO | 2016019493 A1 | 2/2016 |

OTHER PUBLICATIONS

CATT, "NR Radio Link Monitoring", 3GPP TSG RAN WG1#89, R1-1707467, May 15-19, 2017, 3 pages, Hangzhou, P. R. China.

MediaTek Inc., "RLM/RLF and Beam Failure Recovery", 3GPP TSG-RAN WG2 Meeting #98 R2-1704532, May 15-19, 2017, 7 pages, Hangzhou, China.

Qualcomm Incorporated: "Considerations of RLM and RLF in NR", 3GPP TSG-RAN WG2 Meeting #97bis, R2-1703563, Apr. 3-7, 2017, 4 pages, Spokane, USA.

Huawei, "RLF for NR",3GPP TSG-RAN WG2#97 R2-1701801, Feb. 13-17, 2017, 4 pages, Athens, Greece.

Qualcomm Incorporated, "Radio link monitoring consideration", 3GPP TSG-RAN WG1 #89, R1-1708578, May 15-19, 2017, 3 pages, Hangzhou, P.R. China.

Ericsson,"Further considerations on RLM for NR", 3GPP TSG RAN WG4 Meeting #83, R4-1705610, May 15-19, 2017, 2 pages, Hangzhou, P. R. of China.

\* cited by examiner

RADIO LINK MONITORING METHOD AND APPARATUS

CROSS-REFERENCE TO RELATED APPLICATIONS

This application is a continuation of International Application No. PCT/CN2018/091234, filed on Jun. 14, 2018, which claims priority to Chinese Patent Application No. 201710459721.2, filed on Jun. 16, 2017. The disclosures of the aforementioned applications are hereby incorporated by reference in their entireties.

TECHNICAL FIELD

Embodiments of this application relate to the field of communications technologies, and in particular, to a radio link monitoring method and apparatus.

BACKGROUND

In a long term evolution (LTE) system, radio link monitoring (RLM) is used for a terminal in a connected mode to evaluate downlink quality of a current serving cell. When the terminal in a connected mode evaluates that the downlink quality cannot meet a requirement of the terminal, the terminal searches for and selects a new cell to reestablish a radio link. In the LTE system, radio link quality is measured based on a cell-specific reference signal (CRS). However, beam transmission is introduced in a 5G communications system, and a CRS sent in each subframe is not considered. Consequently, an RLM technology in the LTE system cannot adapt to development of the 5G communications system. Therefore, a new radio link monitoring method is urgently needed.

SUMMARY

This application provides a radio link monitoring method and apparatus, and may be applied to a 5G communications system.

According to a first aspect, this application provides a radio link monitoring method and apparatus.

In a possible design, the method may include: receiving, by a higher layer of a terminal, a beam detection result message from a lower layer of the terminal, where the beam detection result message is used to indicate a result of beam monitoring; and controlling, by the higher layer of the terminal, a radio link monitoring procedure based on the beam detection result message. In this technical solution, the radio link monitoring procedure is related to a beam detection procedure. For details, refer to the following descriptions.

In a possible design, the receiving, by a higher layer of a terminal, a beam detection result message from a lower layer of the terminal may specifically include: receiving, by the higher layer of the terminal, beam failure recovery indication information from the lower layer of the terminal, where the beam failure recovery indication information is used to indicate beam failure recovery. In this case, optionally, the controlling, by the higher layer of the terminal, a radio link monitoring procedure based on the beam detection result message may be implemented in the following manner 1 or manner 2.

Manner 1: A timer is restarted, and/or a quantity of pieces of in-synchronization IS indication information received by the higher layer of the terminal is set to 0. In this way, it can be quickly determined that a radio link has been recovered.

Manner 2: A timer is stopped. In this way, a time for the terminal to determine, in a cell, whether a radio link is recovered is prolonged, so that it can be more accurately determined whether the radio link can be recovered in the cell.

Optionally, the higher layer of the terminal receives the beam failure recovery indication information from the lower layer of the terminal in timing duration of the timer.

In a possible design, the receiving, by a higher layer of a terminal, a beam detection result message from a lower layer of the terminal may specifically include: receiving, by the higher layer of the terminal, beam failure indication information from the lower layer of the terminal, where the beam failure indication information is used to indicate a beam failure. In this case, optionally, the controlling, by the higher layer of the terminal, a radio link monitoring procedure based on the beam detection result message may be implemented in the following manner 3 or manner 4:

Manner 3: If the beam failure indication information is received before a timer is started, the higher layer of the terminal starts the timer. In this way, a radio link quality abnormality can be quickly determined, and radio link recovery can be achieved as quickly as possible.

Manner 4: If the beam failure indication information is received in timing duration of a timer, the higher layer of the terminal determines that a radio link failure occurs. In this way, a cell search and selection procedure can be started as quickly as possible, and radio link recovery can be achieved as quickly as possible.

The timer in any technical solution provided above may be configured to set a recovery time of the radio link. Specifically, the timer can be configured to set the recovery time of the radio link before the radio link fails. Optionally, the timer is configured to set a maximum recovery time of the radio link. For example, the timer may be a timer T310.

Correspondingly, this application provides a radio link monitoring apparatus, and the apparatus may implement the radio link monitoring method in the first aspect. For example, the apparatus may be a chip (such as a baseband chip or a communications chip), or may be a terminal, and the apparatus may implement the foregoing method by using software or hardware, or by executing corresponding software by hardware.

In a possible design, the apparatus may include a processor and a memory. The processor is configured to support the apparatus in performing a corresponding function in the method in the first aspect. The memory is configured to couple to the processor; and the memory stores a program (instruction) and data that are necessary for the apparatus. In addition, the apparatus may include a communications interface, configured to support communication between the apparatus and another network element. The communications interface may be a transceiver.

In a possible design, the apparatus may include a lower layer processing unit and a higher layer processing unit. The higher layer processing unit is configured to receive a beam detection result message from the lower layer processing unit, where the beam detection result message is used to indicate a result of beam monitoring; and control a radio link monitoring procedure based on the beam detection result message.

In a possible design, the higher layer processing unit may be specifically configured to receive beam failure recovery indication information from the lower layer processing unit, where the beam failure recovery indication information is used to indicate beam failure recovery. In this case, optionally, that the higher layer processing unit controls the radio link monitoring procedure based on the beam detection result message may be implemented in the manner 1 or manner 2 above.

In a possible design, the higher layer processing unit may be specifically configured to receive beam failure indication information from the lower layer processing unit, where the beam failure indication information is used to indicate a beam failure. In this case, optionally, that the higher layer processing unit controls the radio link monitoring procedure based on the beam detection result message may be implemented in the manner 3 or manner 4 above.

According to a second aspect, this application further provides a radio link monitoring method and apparatus.

In a possible design, the method may include: detecting, by a lower layer of a terminal, a first value of radio link quality, where the first value is obtained based on a channel state information-reference signal (CSI-RS) and/or a reference signal in a downlink synchronization signal block (SS block); and sending, by the lower layer of the terminal, first indication information to a higher layer of the terminal if it is determined that the first value is less than or equal to a first threshold, where the first indication information is used to indicate that a radio link is out of synchronization. Optionally, the first indication information is out-of-synchronization (OOS) indication information. In this technical solution, the radio link quality is obtained based on the CSI-RS and/or the reference signal in the SS block, to perform radio link monitoring. Therefore, the method may be applied to a 5G communications system.

In a possible design, the method further includes: detecting, by the lower layer of the terminal, a second value of the radio link quality, where the second value is obtained based on the CSI-RS and/or the reference signal in the SS block; and sending, by the lower layer of the terminal, second indication information to the higher layer of the terminal if it is determined that the second value is less than or equal to a second threshold, where the second indication information is used to indicate that the radio link recovers synchronization. Optionally, the second indication information is in-synchronization (IS) indication information.

In a possible design, the detecting, by the lower layer of the terminal, a second value of the radio link quality may specifically include: detecting, by the lower layer of the terminal, the second value of the radio link quality in timing duration of a timer T310. Optionally, in the timing duration of the timer T310, the lower layer of the terminal may detect the radio link quality at intervals of a time period, to obtain the second value. For related descriptions of the time period, refer to the following descriptions. Details are not described herein.

Correspondingly, this application provides a radio link monitoring apparatus, and the apparatus may implement the radio link monitoring method in the second aspect. For example, the apparatus may be a chip (such as a baseband chip or a communications chip), or may be a terminal, and the apparatus may implement the foregoing method by using software or hardware, or by executing corresponding software by hardware.

In a possible design, the apparatus may include a processor and a memory. The processor is configured to support the apparatus in performing a corresponding function in the method in the second aspect. The memory is configured to couple to the processor, and the memory stores a program (instruction) and data that are necessary for the apparatus. In addition, the apparatus may include a communications interface, configured to support communication between the apparatus and another network element. The communications interface may be a transceiver.

In a possible design, the apparatus may include a lower layer processing unit and a higher layer processing unit. The lower layer processing unit is configured to: detect a first value of radio link quality, where the first value is obtained based on a channel state information-reference signal (CSI-RS) and/or a reference signal in a downlink synchronization signal block (SS block); and send first indication information to the higher layer processing unit if it is determined that the first value is less than or equal to a first threshold, where the first indication information is used to indicate that a radio link is out of synchronization. Optionally, the first indication information is out-of-synchronization (OOS) indication information.

In a possible design, the lower layer processing unit is further configured to: detect a second value of the radio link quality, where the second value is obtained based on the CSI-RS and/or the reference signal in the SS block; and send second indication information to the higher layer processing unit if it is determined that the second value is less than or equal to a second threshold, where the second indication information is used to indicate that the radio link recovers synchronization. Optionally, the second indication information is in-synchronization (IS) indication information.

In a possible design, the lower layer processing unit is specifically configured to detect the second value of the radio link quality in timing duration of a timer T310.

In a possible design, the lower layer processing unit and the higher layer processing unit may be separately disposed on two chips, or may be integrated on one chip.

According to a third aspect, this application further provides an indication method and apparatus.

In a possible design, the method may include: sending, by a network device, a first message to a terminal, where the first message is used to indicate a manner in which the terminal obtains a value of radio link quality based on a reference signal. In this technical solution, the network device uses the first message to indicate the manner of obtaining the value of the radio link quality, so that a technical problem that the terminal does not know how to obtain the value of the radio link quality is resolved.

Correspondingly, this application provides an indication apparatus, and the apparatus may implement the indication method in the third aspect. For example, the apparatus may be a network device, and the apparatus may implement the foregoing method by using software or hardware, or by executing corresponding software by hardware.

In a possible design, the apparatus may include a processor and a memory. The processor is configured to support the apparatus in performing a corresponding function in the method in the third aspect. The memory is configured to couple to the processor, and the memory stores a program (instruction) and data that are necessary for the apparatus. In addition, the apparatus may include a communications interface, configured to support communication between the apparatus and another network element. The communications interface may be a transceiver.

In a possible design, the apparatus may include a transceiver unit. The transceiver unit is configured to send a first message to a terminal, where the first message is used to indicate a manner in which the terminal obtains a value of radio link quality based on a reference signal.

According to a fourth aspect, this application further provides a method and an apparatus for obtaining radio link quality.

In a possible design, the method may include: receiving, by a terminal, a first message, and then determining, based on the first message, a manner of obtaining a value of radio link quality based on a reference signal. In this technical solution, a network device uses the first message to indicate the manner of obtaining the value of the radio link quality, so that a technical problem that the terminal does not know how to obtain the value of the radio link quality is resolved.

Correspondingly, this application provides an apparatus for obtaining radio link quality, and the apparatus may implement the indication method in the fourth aspect. For example, the apparatus may be a terminal, and the apparatus may implement the foregoing method by using software or hardware, or by executing corresponding software by hardware.

In a possible design, the apparatus may include a processor and a memory. The processor is configured to support the apparatus in performing a corresponding function in the method in the fourth aspect. The memory is configured to couple to the processor, and the memory stores a program (instruction) and data that are necessary for the apparatus. In addition, the apparatus may include a communications interface, configured to support communication between the apparatus and another network element. The communications interface may be a transceiver.

In a possible design, the apparatus may include a transceiver unit and a processing unit. The transceiver unit is configured to receive a first message. The processing unit is configured to determine, based on the first message, a manner of obtaining a value of radio link quality based on a reference signal.

Based on any technical solution provided in the third aspect or the fourth aspect, the manner of obtaining the value of the radio link quality based on the reference signal may be one or more of the following: generating the value of the radio link quality based on a reference signal in an SS block, or generating the value of the radio link quality based on a CSI-RS, or generating the value of the radio link quality based on a reference signal in an SS block and a CSI-RS.

This application further provides a computer storage medium, where the computer storage medium stores a computer program (instruction), and when the program (instruction) is run on a computer, the computer is enabled to perform the method according to any one of the foregoing aspects.

This application further provides a computer program product, where when the computer program product is run on a computer, the computer is enabled to perform the method according to any one of the foregoing aspects.

It may be understood that any apparatus, computer storage medium, or computer program product provided above is configured to perform a corresponding method provided in the foregoing descriptions. Therefore, for a beneficial effect that can be achieved by any apparatus, computer storage medium, or computer program product, refer to a beneficial effect in a corresponding method. Details are not described herein again.

DETAILED DESCRIPTION OF ILLUSTRATIVE EMBODIMENTS

The technical solutions provided in this application may be applied to various communications systems in which an RLM technology is introduced. For example, the RLM technology, a 5G communications system, a future evolved system, or a plurality of communications convergence systems are introduced on the basis of an existing communications system. There may be a plurality of application scenarios, for example, machine-to-machine (M2M), D2M, macro-micro communications, enhanced mobile broadband (eMBB), ultra-reliable and low latency communications (uRLLC), and massive machine type communications (mMTC) scenarios. These scenarios may include but are not limited to a scenario of communication between a terminal and a terminal, a scenario of communication between a network device and a network device, a scenario of communication between a network device and a terminal, and the like. Alternatively, the technical solutions provided in this application may be applied to a scenario of communication between a terminal and a terminal, a scenario of communication between a network device and a network device, or the like in a 5G communications system.

Figure 1:
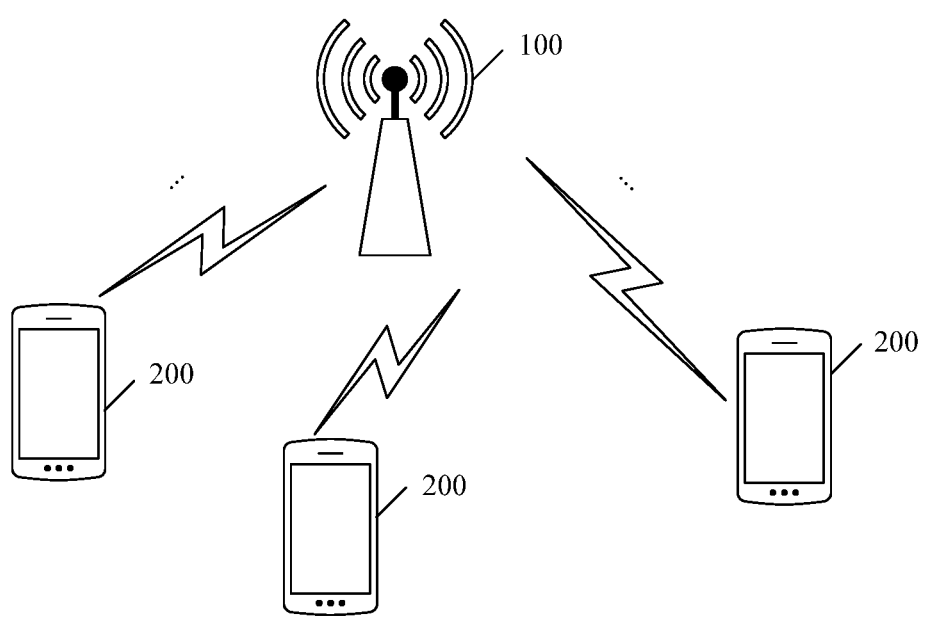
FIG. 1 is a schematic diagram of a system architecture to which a technical solution is applicable according to an embodiment of this application.

FIG. 1 is a schematic diagram of a communications system. The communications system may include at least one network device 100 (only one network device 100 is shown) and one or more terminals 200 connected to the network device 100.

The network device 100 may be a device that can communicate with the terminal 200. The network device 100 may be a relay node, an access point, or the like. The network device 100 may be a base transceiver station (BTS) in a global system for mobile communications (GSM) or code division multiple access (CDMA) network, or may be an NB (NodeB) in wideband code division multiple access (WCDMA), or may be an eNB or eNodeB (evolved NodeB) in LTE. The network device 100 may alternatively be a radio controller in a cloud radio access network (CRAN) scenario. The network device 100 may alternatively be a network device in a 5G network or a network device in a future evolved network; or may be a wearable device, an in-vehicle device, or the like.

The terminal 200 may be user equipment (UE), an access terminal, a UE unit, a UE station, a mobile station, a mobile console, a remote station, a remote terminal, a mobile device, a UE terminal, a terminal, a wireless communications device, a UE agent, a UE apparatus, or the like. The access terminal may be a cellular phone, a cordless telephone set, a session initiation protocol (SIP) phone, a wireless local loop (WLL) station, a personal digital assistant (PDA), a handheld device or a computing device with a wireless communication function, another processing device connected to a wireless modem, an in-vehicle device, a wearable device, a terminal in a future 5G network, a terminal in a future evolved PLMN network, or the like.

Figure 2:
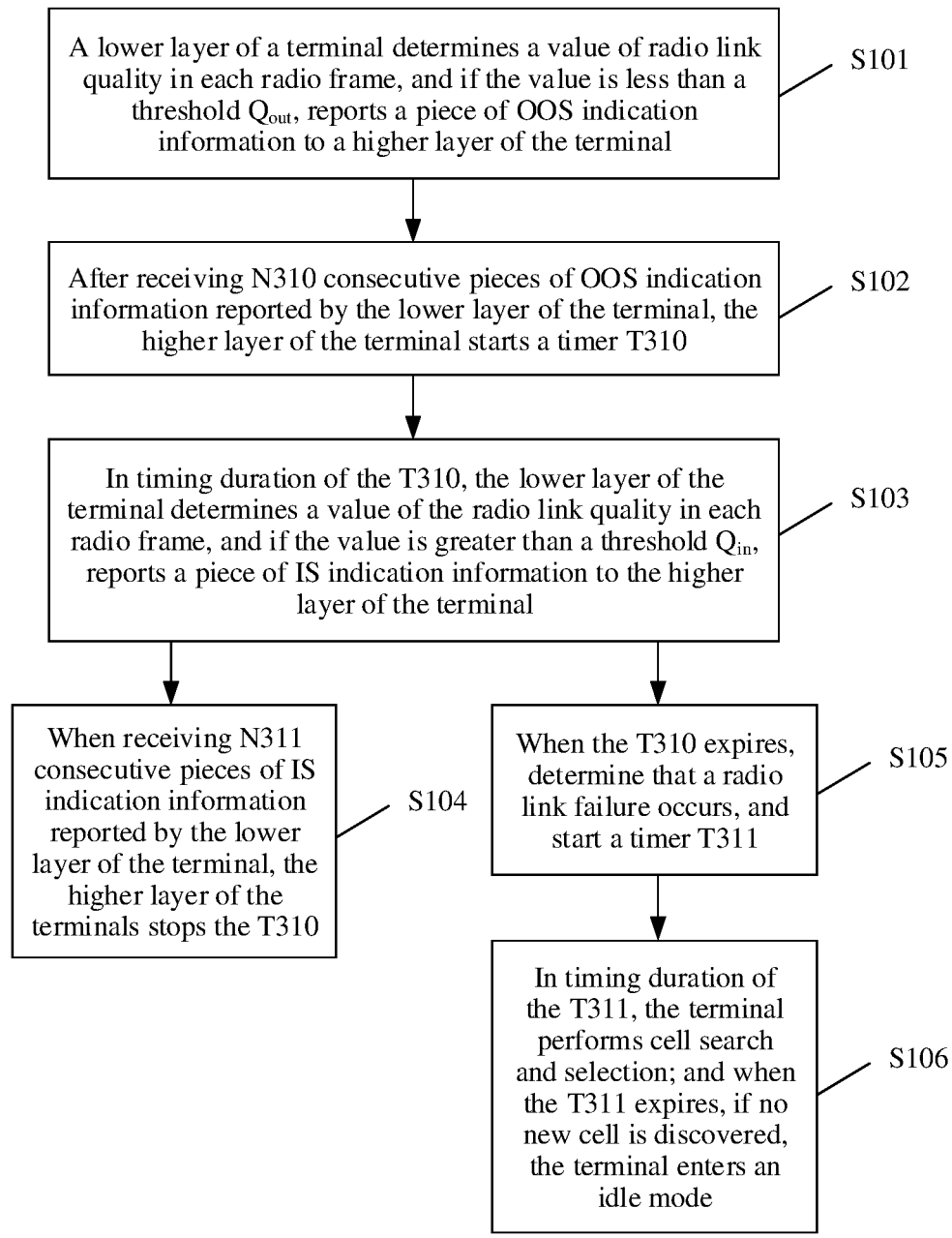
FIG. 2 is a schematic flowchart of RLM in an LTE system according to an embodiment of this application.

FIG. 2 is a schematic flowchart of RLM in an LTE system. A method shown in FIG. 2 may include the following steps.

S101. A lower layer (for example, a physical layer) of a terminal determines a value of radio link quality in each radio frame, that is, 10 ms (milliseconds); compares the value with a preset threshold that may be denoted as, for example, $Q_{out}$; and if the value is less than $Q_{out}$, reports a piece of out-of-synchronization (OOS) indication information to a higher layer (for example, a layer 3) of the terminal.

The value of the radio link quality is obtained by performing, by the lower layer of the terminal, for example, the physical layer, signal-to-noise ratio (SNR) evaluation on radio link quality indicators of cell-specific reference signals (CRS) in the first 200 ms for each radio frame. The radio link quality indicator (also referred to as an SNR evaluation indicator) may be, for example, but is not limited to, reference signal received power (RSRP) and reference signal received quality (RSRQ).

S102. After receiving N310 consecutive pieces of OOS indication information reported by the lower layer of the terminal, the higher layer of the terminal starts a timer T310. Timing duration is set for the timer T310. N310 may be an integer greater than or equal to 1.

S103. In timing duration of the timer T310, the lower layer of the terminal determines a value of the radio link quality in each radio frame; compares the value with a preset threshold that may be denoted as, for example, $Q_{in}$; and if the value is greater than $Q_{in}$, reports a piece of in-synchronization (IS) indication information to the higher layer of the terminal.

S104. When receiving N311 consecutive pieces of IS indication information reported by the lower layer of the terminal, the higher layer of the terminal stops the timer T310. N311 may be an integer greater than or equal to 1.

If the higher layer of the terminal receives the N310 consecutive pieces of OOS indication information reported by the lower layer of the terminal, in this case, it indicates that the radio link quality is abnormal. The terminal starts the timer T310, to determine, in the timing duration of the timer T310, whether a radio link can be recovered. In the timing duration of the timer T310, when the higher layer of the terminal receives the N311 consecutive pieces of IS indication information reported by the lower layer of the terminal, the terminal stops the timer T310, and in this case, the terminal considers that the radio link is recovered. So far, this radio link monitoring procedure ends.

S105. When the timer T310 expires, but the higher layer of the terminal does not receive the N311 consecutive pieces of IS indication information reported by the lower layer of the terminal, the higher layer of the terminal determines that a radio link failure (RLF) occurs, and starts a timer T311. Timing duration is set for the timer T311.

The timing duration that is set in the timer T311 may be equal to or not equal to the timing duration that is set in the timer T310.

S106. In the timing duration of the timer T311, the terminal performs cell search and selection. When the timer T311 expires, if the terminal still does not discover a new cell, the terminal enters an idle mode.

The terminal starts the timer T311, to determine, in the timing duration of the timer T311, whether radio link recovery can be implemented through the cell search and selection. In the timing duration of the timer T311, if the terminal discovers a new cell, it indicates that the radio link recovery is achieved through the cell search and selection, and the terminal stops the timer T311. The terminal considers that the radio link recovery is achieved through the cell search and selection.

Figure 3:
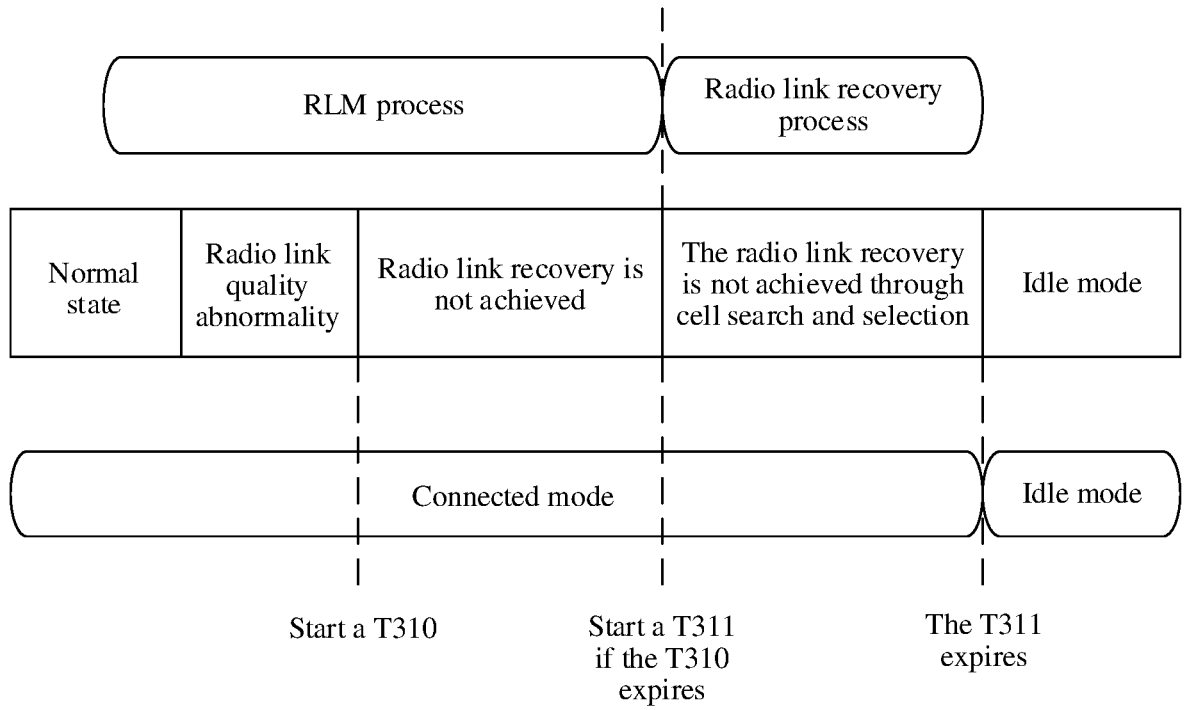
FIG. 3 is a schematic diagram of a process of a technical solution shown in FIG. 2 according to an embodiment of this application.

FIG. 3 is a schematic diagram of a process of the technical solution shown in FIG. 2. In FIG. 3, a normal state is a state of a terminal in a connected mode before a radio link quality abnormality is detected. An RLM process is a process from the normal state to expiration of the timer T310. When the RLM process is considered to start in the normal state is not limited in this application, and may be flexibly designed based on a plurality of manners in an implementation process. FIG. 3 is only an example. A radio link recovery process is a process in the timing duration of the timer T311.

Figure 4:
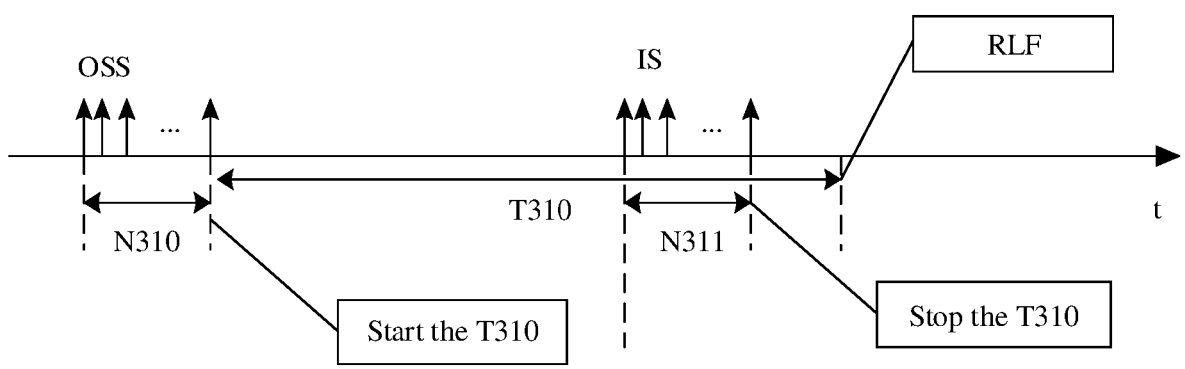
FIG. 4 is a sequence diagram of the technical solution shown in FIG. 2 according to an embodiment of this application.

FIG. 4 is a sequence diagram of the technical solution shown in FIG. 2. In FIG. 4, in the timing duration of the timer T310 started by the higher layer of the terminal, if the N311 pieces of IS indication information are received, it is considered that the radio link is recovered, and therefore, the timer T310 is stopped. If the N311 pieces of IS indication information are not received in the timing duration of the timer T310, it is considered that the radio link failure (namely, RLF) occurs. A process such as the cell search and selection is not shown in FIG. 4.

After a concept of beam is introduced in a communications system, a beam detection technology is further introduced. A beam is a communication resource. A beam may include a wide beam, a narrow beam, or a beam of another type. A technology for forming a beam may be a beamforming technology or another technical means. The beamforming technology may be specifically a digital beamforming technology, an analog beamforming technology, or a hybrid beamforming technology. Different beams may be considered as different resources. Same information or different information may be sent by using different beams. Optionally, a plurality of beams that have a same or similar communication feature may be considered as one beam. One beam may correspond to one or more antenna ports, and is used to transmit a data channel, a control channel, a sounding signal, and the like. For example, a transmit beam may refer to distribution of signal strength formed in different directions in space after a signal is transmitted out through an antenna. A receive beam may refer to distribution of signal strength that is of a radio signal received from an antenna and that is formed in different directions in space.

Figure 5:
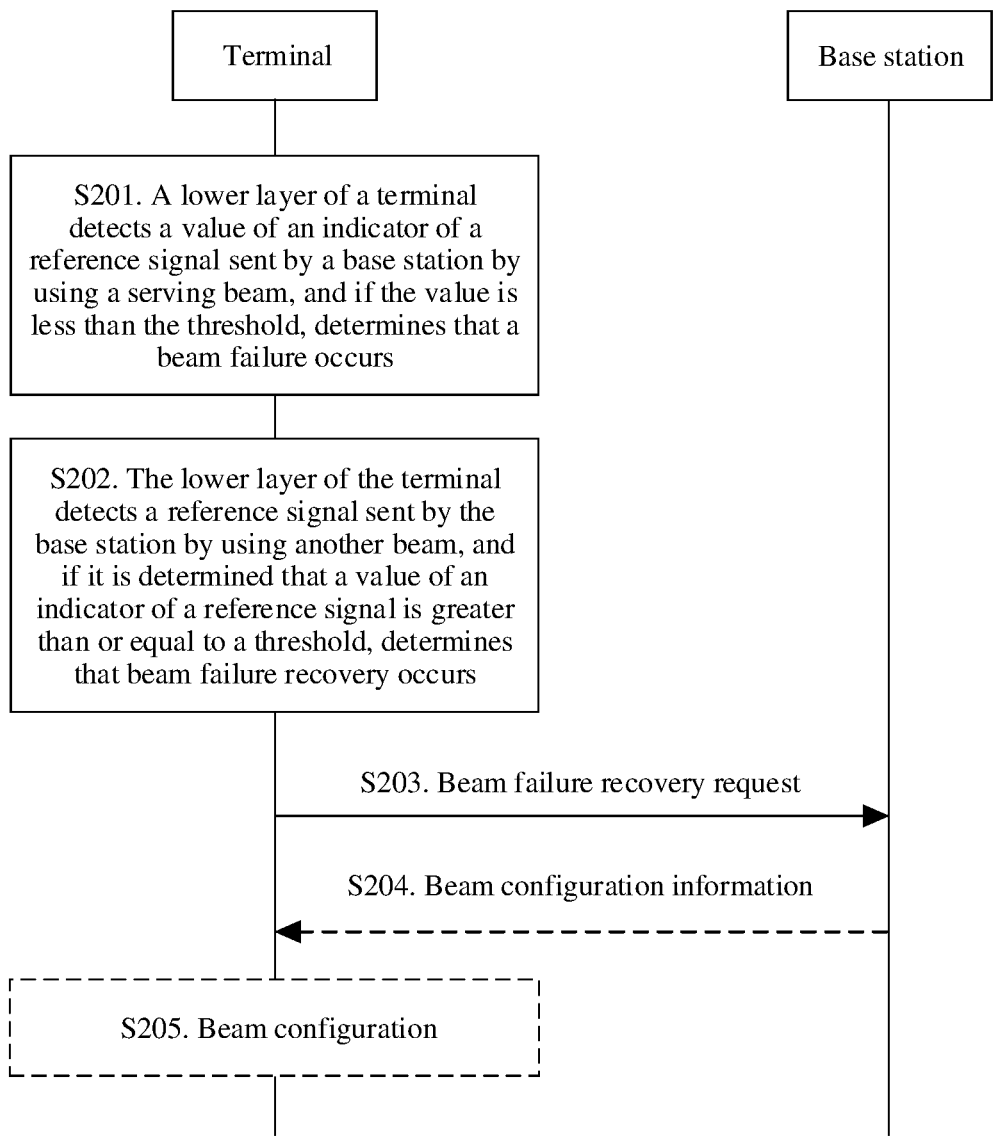
FIG. 5 is a schematic flowchart of beam detection according to an embodiment of this application.

FIG. 5 is a schematic flowchart of beam detection. A method shown in FIG. 5 may include the following steps.

S201. A terminal, for example, a lower layer of the terminal, detects a value of an indicator of a reference signal sent by a base station by using one or more serving beams; compares the value with a threshold; and if the value is less than the threshold, determines that a beam failure occurs. The indicator may be, for example, but is not limited to, RSRP or RSRQ. The threshold may be equal to or not equal to $Q_{out}$ in the foregoing descriptions.

The base station may generate a plurality of beams, and the serving beam is a beam that is in the plurality of beams and that serves the terminal.

S202. The terminal, for example, the lower layer of the terminal, detects a reference signal sent by the base station by using another beam, where the another beam may be a beam other than the serving beam; and if it is determined that a value of a quality indicator of at least one reference signal is greater than or equal to a threshold, determines that beam failure recovery occurs. The quality indicator may be, for example, but is not limited to, RSRP or RSRQ. The threshold may be equal to or not equal to $Q_{in}$ in the foregoing descriptions. The beam for sending the reference signal is a new serving beam.

S203. The terminal sends a beam failure recovery request to the base station, where the beam failure recovery request may include information that indicates the new serving beam.

S204. The base station sends beam configuration information to the terminal; and after receiving the beam configuration information, the terminal performs beam configuration, and returns a beam configuration information acknowledgement to the base station. Subsequently, the terminal may receive information that is sent by the base station by using the new serving beam. It may be understood that, for a beam detection process, step S204 is an optional step.

Figure 6:
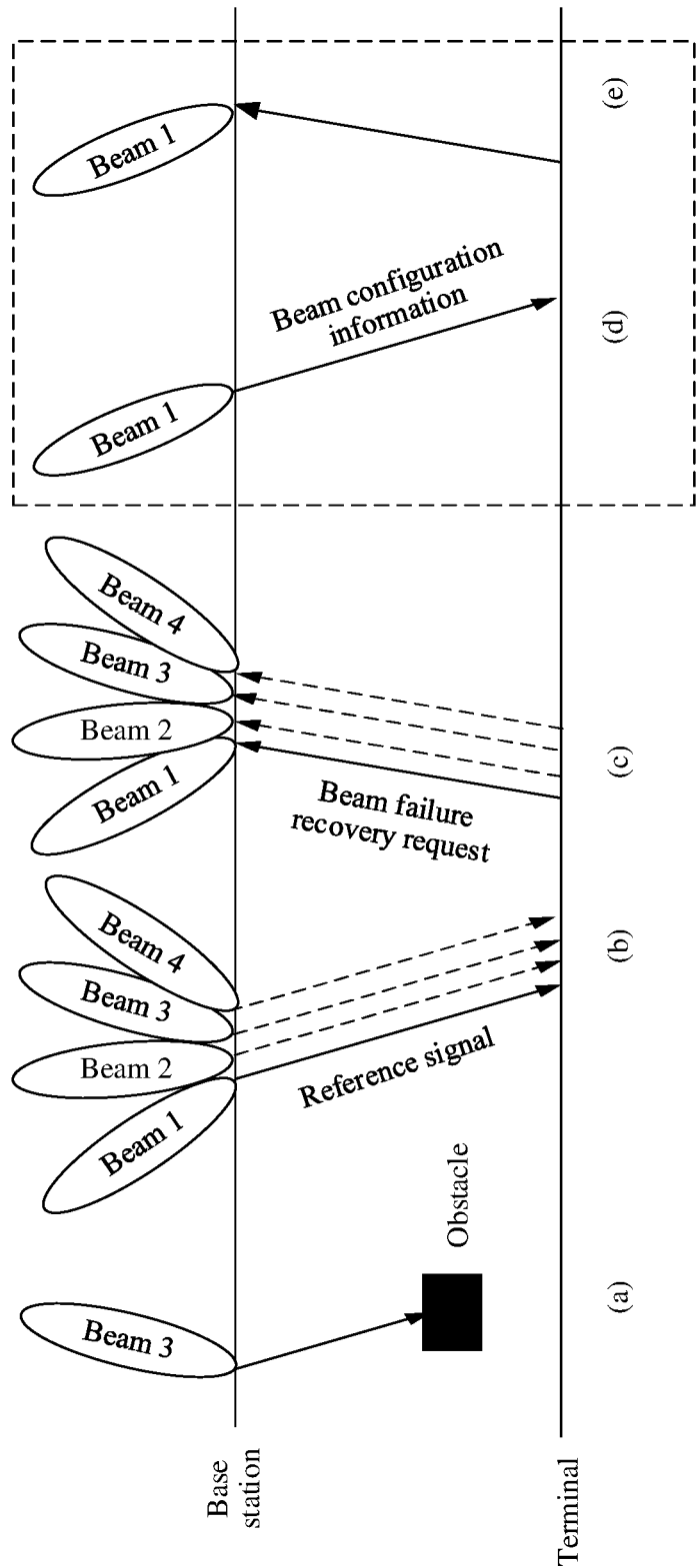
FIG. 6 is a schematic diagram of a process of a technical solution shown in FIG. 5 according to an embodiment of this application.

FIG. 6 shows an example of the technical solution shown in FIG. 5. In FIG. 6, the base station generates four beams (denoted as beams 1 to 4 respectively). This application is not limited thereto. In S201, the serving beam of the terminal is the beam 3, and the beam 3 fails due to an obstacle or the like, as shown in (a) in FIG. 6. In S202, the lower layer of the terminal detects reference signals that are sent by using the beams 1, 2, and 4, and determines the beam 1 as the new serving beam, as shown in (b) in FIG. 6. In S203, the terminal sends the beam failure recovery request to the base station by using the beam 1, as shown in (c) in FIG. 6. Optionally, in S204, the base station sends the beam configuration information to the terminal by using the beam 1, as shown in (d) in FIG. 6. The terminal sends the beam configuration information acknowledgement to the base station by using the beam 1, as shown in (e) in FIG. 6.

It should be noted that the term "lower layer" in this application includes a physical layer (namely, a layer 1) and/or a data link layer (namely, a layer 2); and the "higher layer" includes a layer 3. The timer T310 in this application may be configured to set a recovery time of a radio link, and may be specifically configured to set a maximum recovery time of the radio link. The timer T311 may be configured to set a time for the cell search and selection, and may be specifically configured to set a maximum time for the cell search and selection.

In addition, it should be noted that the term "a plurality of" in this specification means two or more. The terms "first", "second", and the like in this specification are merely intended to distinguish between different objects, and do not limit their order. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally represents an "or" relationship between the associated objects, and the character "/" in a formula represents a "division" relationship between the associated objects.

The following describes the technical solutions provided in this application from a perspective of a radio link monitoring method. It should be noted that, in any embodiment of this application, both N310 and N311 may be integers greater than or equal to 1. In addition, in this application, that the lower layer of the terminal periodically determines the radio link quality is used as an example for description. This application is not limited thereto. For example, determining of the radio link quality may be triggered.

Figure 7:
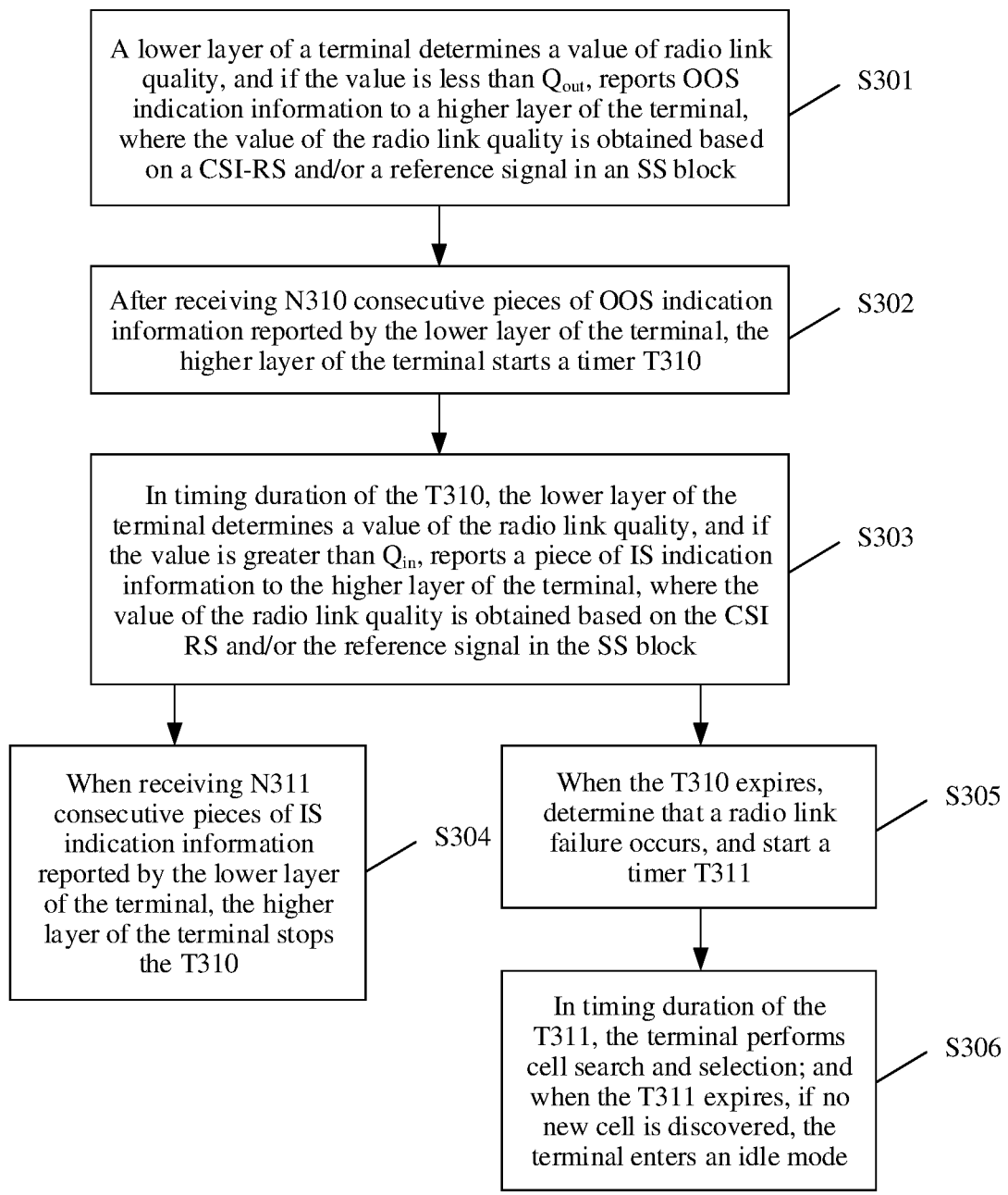
FIG. 7 is a schematic flowchart of a radio link monitoring method according to an embodiment of this application.

FIG. 7 is a schematic flowchart of a radio link monitoring method according to this application. The method includes the following steps.

S301. A lower layer of a terminal determines a value of radio link quality, where the value may be determined in each time period; compares the value with preset $Q_{out}$; and if the value is less than $Q_{out}$, reports a piece of OOS indication information to a higher layer of the terminal. The value of the radio link quality may be obtained based on a CSI-RS and/or a reference signal in an SS block, for example, may be obtained by performing SNR evaluation on a radio link quality indicator of the CSI-RS and/or the reference signal in the SS block in a period of time before a current time period. $Q_{out}$ may be the same as or different from $Q_{out}$ in an LTE system. Optionally, the CSI-RS may be used for beam management, or may be used for beam failure detection/recovery, or may be used for mobility measurement. This is not limited in this application.

For S302, refer to the foregoing S102. Certainly, this application is not limited thereto.

S303. In timing duration of a timer T310, the lower layer of the terminal determines a value of the radio link quality, where the value may be determined in each time period; compares the value with preset $Q_{in}$; and if the value is greater than $Q_{in}$, reports a piece of IS indication information to the higher layer of the terminal. The value of the radio link quality is obtained based on the CSI-RS and/or the reference signal in the SS block, for example, may be obtained by performing SNR evaluation on a radio link quality indicator of the CSI-RS and/or the reference signal in the SS block in a period of time before a current time period. The time period in S303 may be the same as or different from the time period in S301. $Q_{in}$ may be the same as or different from $Q_{in}$ in the LTE system.

For S304 to S306, refer to the foregoing S104 to S106. Certainly, this application is not limited thereto.

In an embodiment of this application, the value of the radio link quality may be obtained by performing the SNR evaluation on the radio link quality indicator of the reference signal in the SS block in the period of time before a current time period. For example, in S301, the period of time may be the last 200 ms before this time period. In S303, the period of time may be the last 100 ms before a current time period. Certainly, this application is not limited thereto. The reference signal in the SS block may be, for example, but is not limited to, at least one of the following: a primary synchronization signal (PSS), a secondary synchronization signal (SSS), or a physical broadcast channel (PBCH) demodulation reference signal (DMRS). The radio link quality indicator may be, for example, but is not limited to, RSRP or RSRQ. The time period may be N SS burst set periods, for example, 20*N ms, where N is an integer greater than or equal to 1. One SS burst set period may include one or more SS blocks. If one time period includes a plurality of SS blocks, the value of the radio link quality may be, for example, but is not limited to, any one of the following values: an average of radio link quality of reference signals in the plurality of SS blocks in the time period, an average of radio link quality of a plurality of reference signals with strongest RSRP in the time period, an average of radio link quality of a plurality of reference signals with radio link quality that exceeds a threshold in the time period, or a value of best radio link quality in the time period.

In another embodiment of this application, the value of the radio link quality may be obtained by performing the SNR evaluation on the radio link quality indicator of the channel state information-reference signal (CSI-RS) in the period of time before a current time period. For example, in S301, the period of time may be the last 200 ms before a current time period. In S303, the period of time may be the last 100 ms before a current time period. Certainly, this application is not limited thereto. The radio link quality indicator may be, for example, but is not limited to, RSRP or RSRQ. The time period may be N CSI-RS sending periods, for example, 40*N ms, where N is an integer greater than or equal to 1. The value of the radio link quality may be, for example, but is not limited to, any one of the following values: an average of radio link quality of a plurality of CSI-RSs in one time period, an average of radio link quality of a plurality of CSI-RSs with best radio link quality in one time period, an average of radio link quality of a plurality of CSI-RSs with radio link quality that exceeds a threshold in one time period, or a value of best radio link quality in one time period.

In another embodiment of this application, the terminal may perform radio link monitoring by using the reference signal in the SS block and the CSI-RS. Optionally, the time period may be a common multiple of one or more SS burst set periods and one or more CSI-RS sending periods. In this embodiment, the value of the radio link quality that is obtained based on the reference signal in the SS block may be, for example, but is not limited to, any one of the following values: an average of radio link quality of reference signals in a plurality of SS blocks in the time period, an average of radio link quality of a plurality of reference signals with strongest RSRP in the time period, an average of radio link quality of a plurality of reference signals with radio link quality that exceeds a threshold in the time period, or a value of best radio link quality in the time period. The value of the radio link quality that is obtained based on the CSI-RS may be, for example, but is not limited to, any one of the following values: an average of radio link quality of a plurality of SS blocks in the time period, an average of radio link quality of a plurality of reference signals with strongest RSRP in the time period, an average of radio link quality of a plurality of reference signals with radio link quality that exceeds a threshold in the time period, or a value of best radio link quality in the time period.

Optionally, when both the value of the radio link quality that is obtained based on the reference signal in the SS block and the value of the radio link quality that is obtained based on the CSI-RS are less than $Q_{out}$, the lower layer of the terminal reports the OOS indication information to the higher layer of the terminal. Alternatively, when either of the value of the radio link quality that is obtained based on the reference signal in the SS block and the value of the radio link quality that is obtained based on the CSI-RS is less than $Q_{out}$, the lower layer of the terminal reports the OOS indication information to the higher layer of the terminal. Alternatively, the value of the radio link quality that is obtained based on the reference signal in the SS block and the value of the radio link quality that is obtained based on the CSI-RS are merged (for example, through weighted summation), and when a value obtained after the merging is less than $Q_{out}$, the lower layer of the terminal reports the OOS indication information to the higher layer of the terminal. Certainly, this application is not limited thereto.

Optionally, when both the value of the radio link quality that is obtained based on the reference signal in the SS block and the value of the radio link quality that is obtained based on the CSI-RS are greater than $Q_{in}$, the lower layer of the terminal reports the IS indication information to the higher layer of the terminal. Alternatively, when either of the value of the radio link quality that is obtained based on the reference signal in the SS block and the value of the radio link quality that is obtained based on the CSI-RS is greater than $Q_{in}$, the lower layer of the terminal reports the IS indication information to the higher layer of the terminal. Alternatively, the value of the radio link quality that is obtained based on the reference signal in the SS block and the value of the radio link quality that is obtained based on the CSI-RS are merged (for example, through weighted summation), and when a value obtained after the merging is greater than $Q_{in}$, the lower layer of the terminal reports the IS indication information to the higher layer of the terminal. Certainly, this application is not limited thereto.

Figure 8:
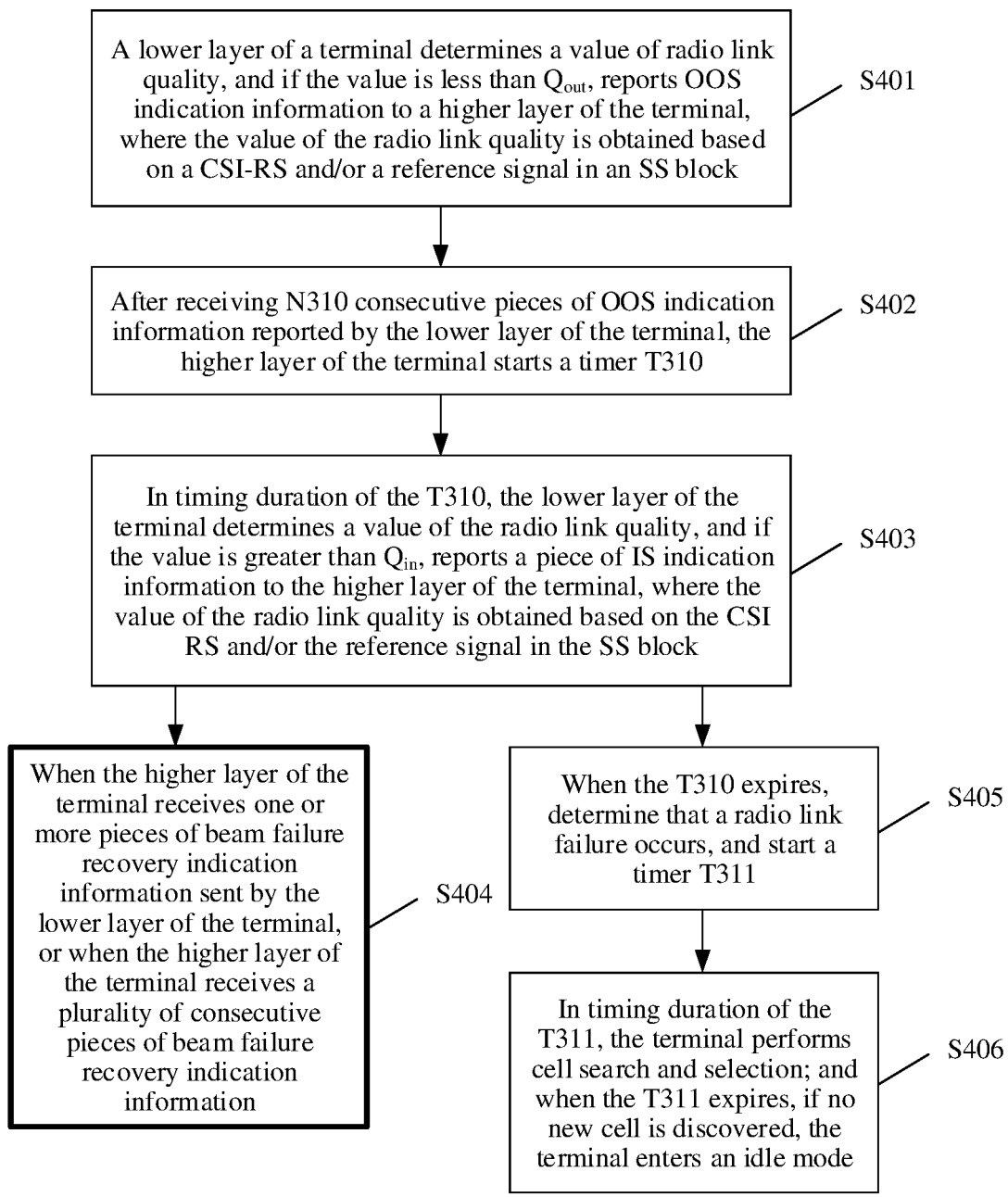
FIG. 8 is a schematic flowchart of another radio link monitoring method according to an embodiment of this application.

It should be noted that, whether the terminal obtains the value of the radio link quality based on either or both of the reference signal in the SS block and the CSI-RS may be pre-specified between the terminal and a base station by using a protocol, or may be provided by the base station to the terminal by using a first message. The first message may be, for example, but is not limited to, any one of the following: a radio resource control (RRC) message, a medium access control (MAC) message, or a downlink control information (DCI). A specific method may be: A network device sends the first message to the terminal, where the first message is used to indicate a manner in which the terminal obtains the value of the radio link quality based on the reference signal. The terminal receives the first message, and then determines the manner of obtaining the value of the radio link quality based on the reference signal. The manner of obtaining the value of the radio link quality based on the reference signal may be one or more of the following: generating the value of the radio link quality based on the reference signal in the SS block, or generating the value of the radio link quality based on the CSI-RS, or generating the value of the radio link quality based on the reference signal in the SS block and the CSI-RS. Although a plurality of network elements are used for description in this embodiment of this application, the solution protected in this application does not require that all network elements be included.

FIG. 8 is a schematic flowchart of a radio link monitoring method according to an embodiment of this application. The method includes the following steps.

For S401 to S403, refer to S301 to S303. Certainly, this application is not limited thereto.

S404. When receiving one or more pieces of beam failure recovery indication information sent by the lower layer of the terminal, or when receiving a plurality of consecutive pieces of beam failure recovery indication information, the higher layer of the terminal stops the timer T310. So far, this radio link monitoring procedure ends. When the timer T3100 is stopped, the higher layer of the terminal still does not receive N311 consecutive pieces of IS indication information reported by the lower layer of the terminal.

That the higher layer of the terminal detects beam failure recovery indicates that the terminal may communicate with a base station by using another beam. In this case, the timer T3100 is stopped. In this embodiment, compared with a solution in an LTE system, it can be quickly determined that a radio link is recovered.

Optionally, if receiving the N311 consecutive pieces of IS indication information reported by the lower layer of the terminal, the higher layer of the terminal stops the timer T310. So far, this radio link monitoring procedure ends. When the timer T3100 is stopped, the higher layer of the terminal still does not detect the beam failure recovery. It may be understood that this step and S404 are parallel steps. The two steps may be understood as follows: The higher layer of the terminal stops the timer T310 when detecting the beam failure recovery and/or receiving the N311 consecutive pieces of IS indication information reported by the lower layer of the terminal.

Referring to FIG. 5, it may be learned that a beam monitoring procedure is performed by the lower layer of the terminal. In some embodiments provided in this application, when detecting the beam failure recovery, the lower layer of the terminal may send one piece of beam failure recovery indication information to the higher layer of the terminal, and the beam failure recovery indication information is used to indicate that the lower layer of the terminal has detected the beam failure recovery. When the higher layer of the terminal receives one or more pieces of beam failure recovery indication information, or when the higher layer of the terminal receives a plurality of consecutive pieces of beam failure recovery indication information, it is determined that the higher layer has detected the beam failure recovery. It may be understood that the lower layer of the terminal may continuously perform beam detection. In this application, a trigger condition for the lower layer to perform the beam detection is not limited. Therefore, the terminal may send the beam failure recovery indication information to the base station for a plurality of times. In addition, because of impact of a factor such as an environment, for a beam, the lower layer usually aperiodically determines that beam failure recovery occurs, and therefore, the lower layer may aperiodically send the beam failure recovery indication information to the higher layer. Optionally, the beam failure recovery indication information may be IS indication information, or may be new indication information.

For S405 to S406, refer to S305 to S306. Certainly, this application is not limited thereto.

In S405, when the timer T310 expires, the higher layer of the terminal still does not detect the beam failure recovery and still does not receive the N311 consecutive pieces of IS indication information reported by the lower layer of the terminal.

Figure 9:
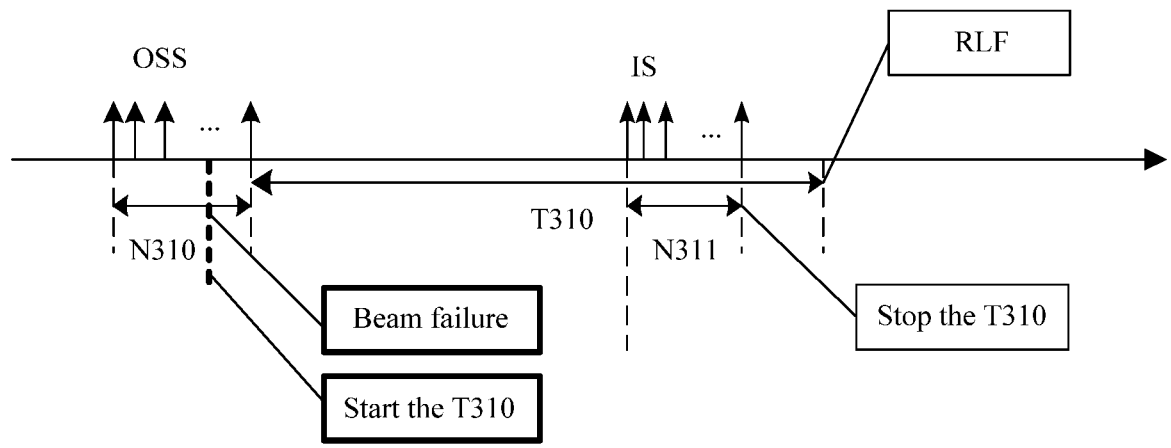
FIG. 9 is a sequence diagram of a technical solution shown in FIG. 8 according to an embodiment of this application.

A sequence diagram of the technical solution provided in this embodiment is shown in FIG. 9.

Figure 10:
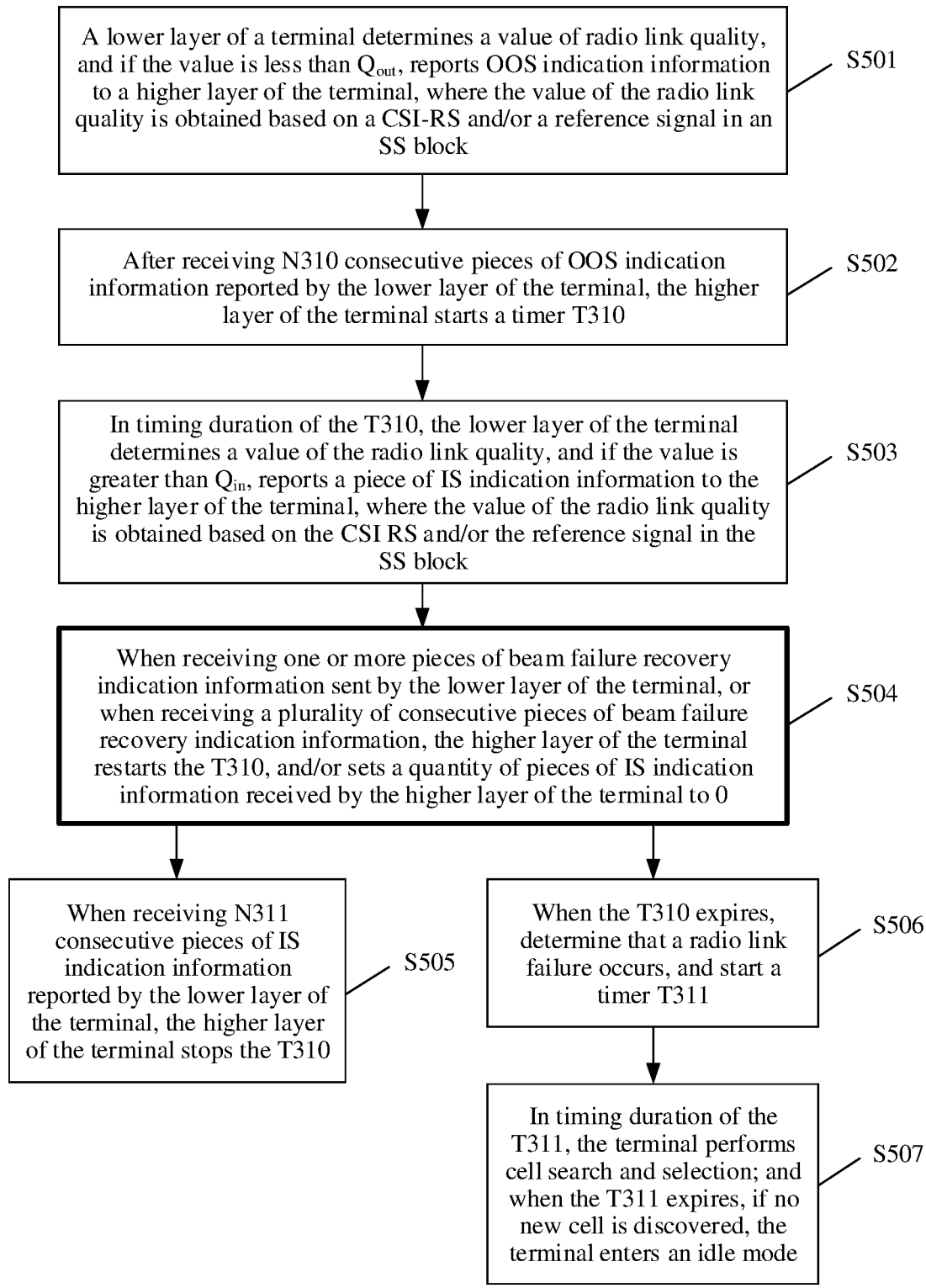
FIG. 10 is a schematic flowchart of another radio link monitoring method according to an embodiment of this application.

FIG. 10 is a schematic flowchart of a radio link monitoring method according to an embodiment of this application. The method includes the following steps.

For S501 to S503, refer to S301 to S303. Certainly, this application is not limited thereto.

S504. When receiving one or more pieces of beam failure recovery indication information sent by the lower layer of the terminal, or when receiving a plurality of consecutive pieces of beam failure recovery indication information, the higher layer of the terminal restarts the timer T310, and/or sets a quantity of pieces of IS indication information received by the higher layer of the terminal to 0.

For an implementation in which the higher layer of the terminal detects beam failure recovery, refer to the foregoing descriptions. Details are not described herein again. That the higher layer of the terminal detects the beam failure recovery indicates that the terminal may communicate with a base station by using another beam. In this case, the timer T310 is restarted, and/or the quantity of pieces of IS indication information received by the higher layer of the terminal is set to 0; in other words, the timer T310 starts timing again, and/or the quantity of pieces of IS indication information received by the higher layer of the terminal is accumulated from 0 again. In this embodiment, which is different from a solution in an LTE system, a time for the terminal to determine, in this cell, whether a radio link is recovered is prolonged, so that it can be more accurately determined whether the radio link can be recovered in the cell.

For S505 to S507, refer to S304 to S306. Certainly, this application is not limited thereto.

Figure 11:
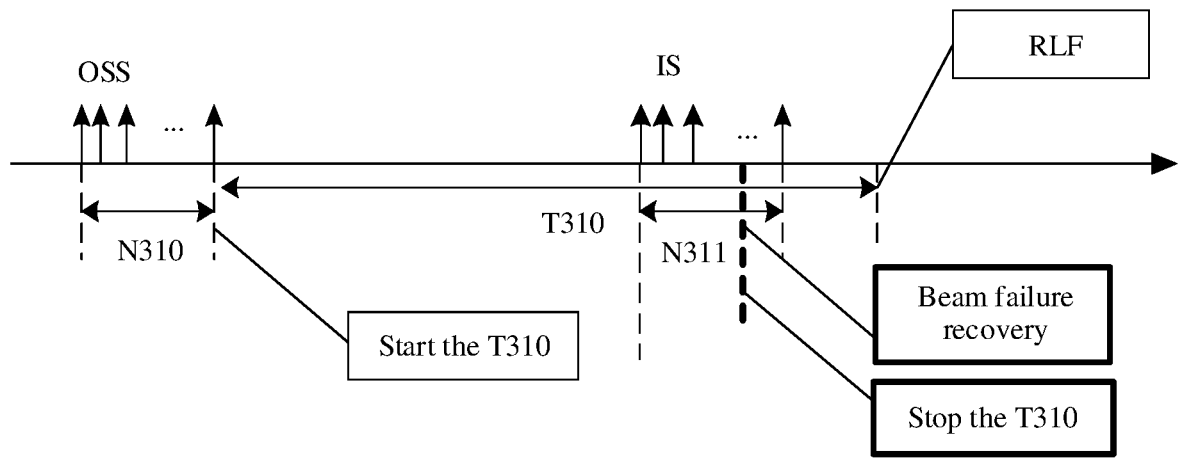
FIG. 11 is a sequence diagram of a technical solution shown in FIG. 10 according to an embodiment of this application.

A sequence diagram of the technical solution provided in this embodiment is shown in FIG. 11.

Figure 12:
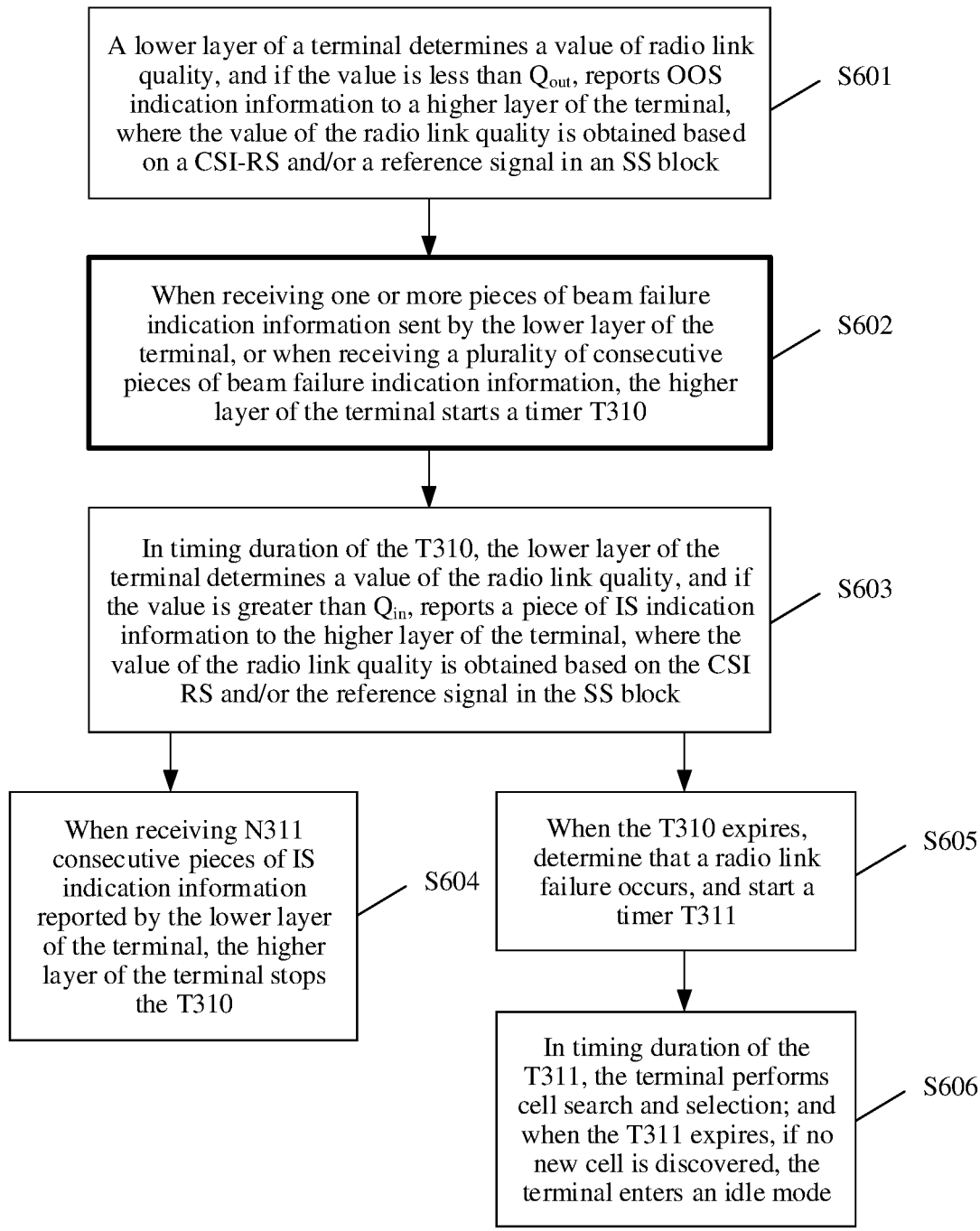
FIG. 12 is a schematic flowchart of another radio link monitoring method according to an embodiment of this application.

FIG. 12 is a schematic flowchart of a radio link monitoring method according to an embodiment of this application. The method includes the following steps.

For S601, refer to S301. Certainly, this application is not limited thereto.

S602. When receiving one or more pieces of beam failure indication information sent by the lower layer of the terminal, or when receiving a plurality of consecutive pieces of beam failure indication information, the higher layer of the terminal starts a timer T310. Timing duration is set for the timer T310. When the timer T310 is started, the higher layer of the terminal still does not receive N310 consecutive pieces of OOS indication information reported by the lower layer of the terminal.

When the higher layer of the terminal detects a beam failure, it indicates that quality of a serving beam is relatively poor. In this case, the timer T310 is started. In this embodiment, which is different from a solution in an LTE system, a radio link quality abnormality can be quickly determined, and radio link recovery can be achieved as quickly as possible.

Optionally, the method may further include: if the higher layer of the terminal receives the N310 consecutive pieces of OOS indication information reported by the lower layer of the terminal, but still does not detect the beam failure, starting the timer T310.

In some embodiments provided in this application, when detecting the beam failure, the lower layer of the terminal may send one piece of beam failure indication information to the higher layer of the terminal, and the beam failure indication information is used to indicate that the lower layer has detected the beam failure. When the higher layer of the terminal receives one or more pieces of beam failure indication information, or when the higher layer of the terminal receives a plurality of consecutive pieces of beam failure indication information, it is determined that the higher layer has detected the beam failure. It may be understood that, for a beam, the lower layer usually aperiodically determines that a beam failure occurs, and therefore, the lower layer may aperiodically send the beam failure indication information to the higher layer. Optionally, the beam failure indication information may be OOS indication information, or may be new indication information.

For S603 to S606, refer to S303 to S306. Certainly, this application is not limited thereto.

Figure 13:
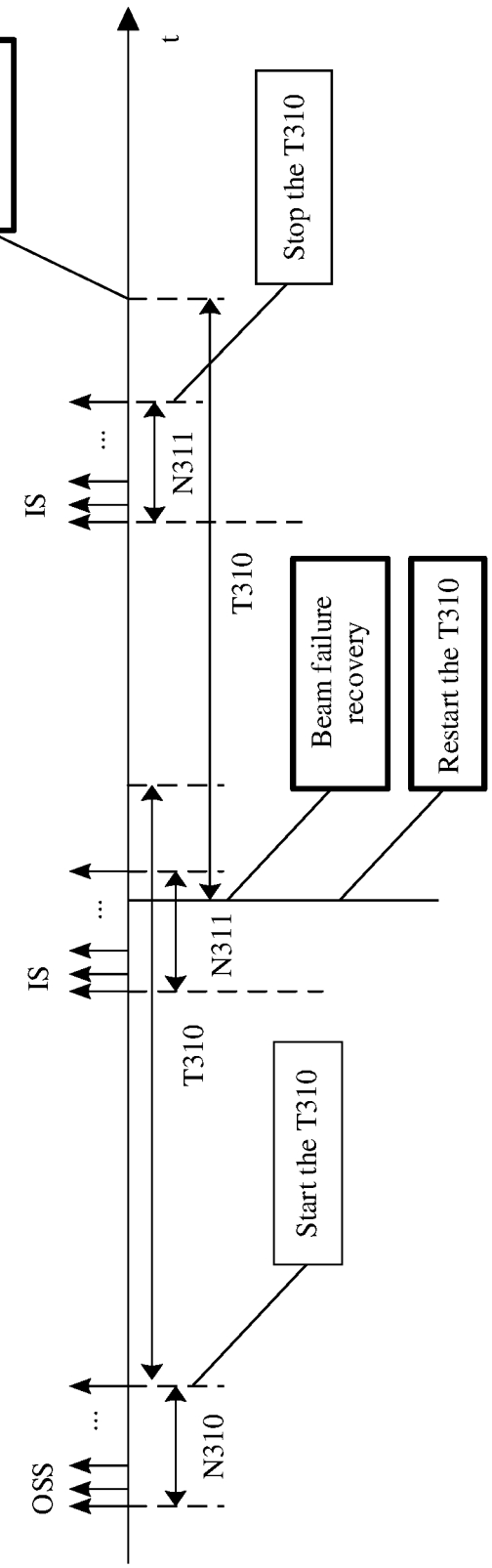
FIG. 13 is a sequence diagram of a technical solution shown in FIG. 12 according to an embodiment of this application.

A sequence diagram of the technical solution provided in this embodiment is shown in FIG. 13.

Figure 14:
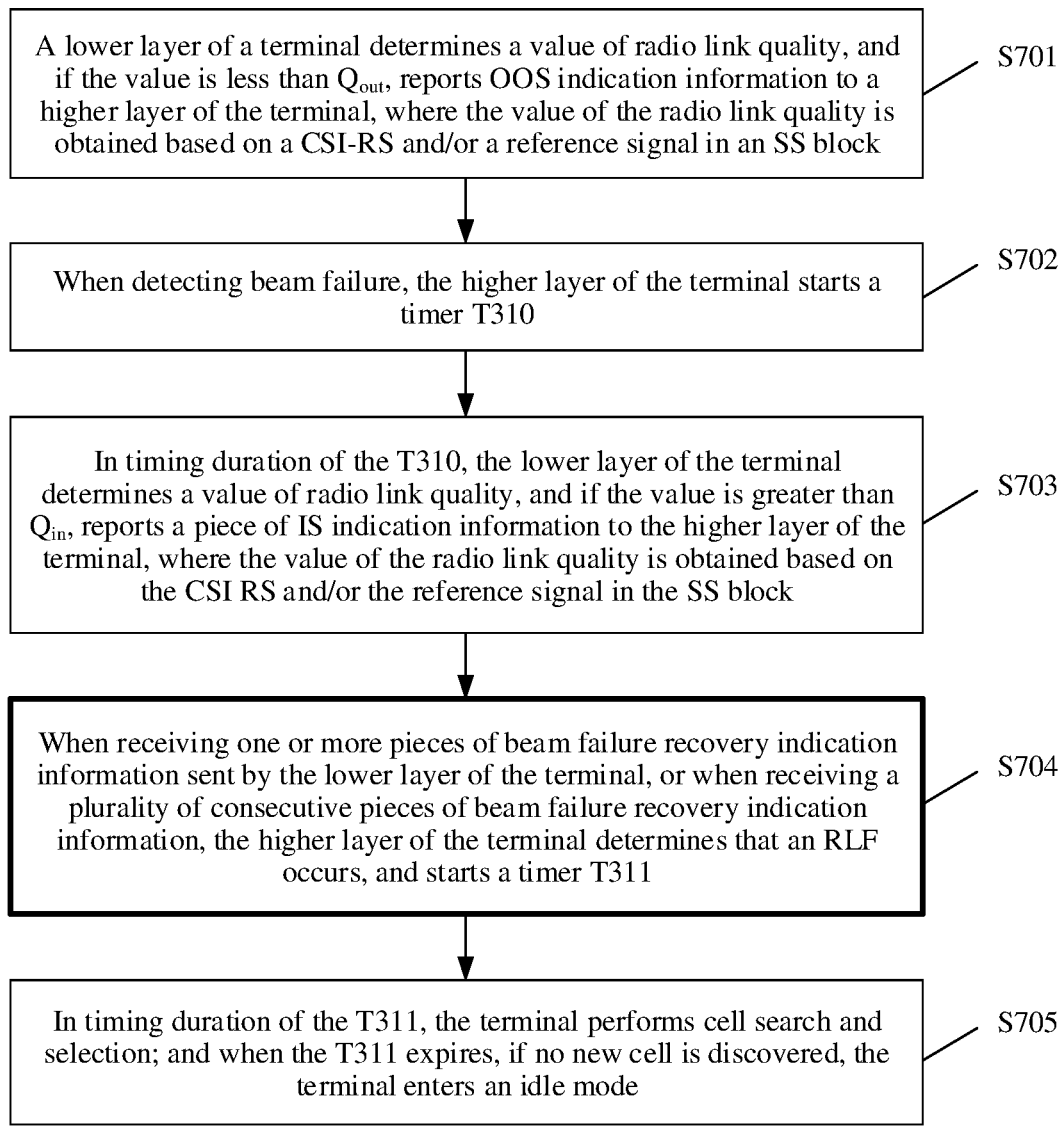
FIG. 14 is a schematic flowchart of another radio link monitoring method according to an embodiment of this application.
Figure 15:
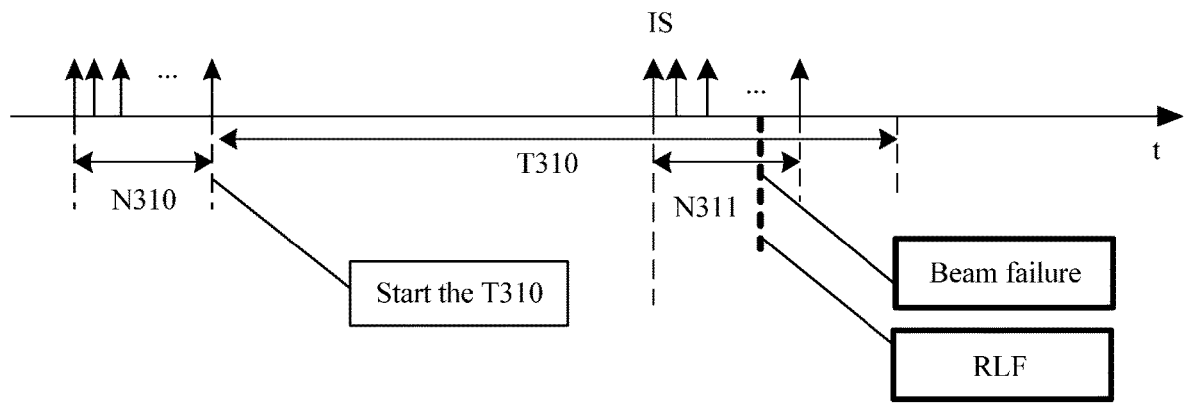
FIG. 15 is a sequence diagram of a technical solution shown in FIG. 14 according to an embodiment of this application.

FIG. 14 is a schematic flowchart of a radio link monitoring method according to an embodiment of this application. The method includes the following steps.

For S701 to S703, refer to S301 to S303. Certainly, this application is not limited thereto.

S704. When receiving one or more pieces of beam failure indication information sent by the lower layer of the terminal, or when receiving a plurality of consecutive pieces of beam failure indication information, the higher layer of the terminal determines that an RLF occurs, and starts a timer T311. When the higher layer of the terminal detects a beam failure, the timer T310 does not expire, and does not receive N311 consecutive pieces of IS indication information reported by the lower layer of the terminal.

For descriptions about detecting the beam failure by the higher layer of the terminal, refer to the foregoing descriptions. Details are not described herein again. When the higher layer of the terminal detects the beam failure, in this case, it indicates that quality of a serving beam is relatively poor. In this case, the RLF may be directly determined, so that a cell search and selection procedure can be started as quickly as possible, and radio link recovery can be achieved as quickly as possible.

Optionally, if the higher layer of the terminal has received, when the timer T310 does not expire, the N311 consecutive pieces of IS indication information reported by the lower layer of the terminal; or if the timer T310 has expired, and the higher layer of the terminal does not receive the N311 consecutive pieces of IS indication information reported by the lower layer of the terminal, for a related implementation, refer to the foregoing descriptions. Details are not described herein again. In addition, if the timer T3100 expires, and the higher layer of the terminal does not detect the beam failure and does not receive the N311 consecutive pieces of IS indication information reported by the lower layer of the terminal, the timer T311 is started.

For S705, refer to S306. Certainly, this application is not limited thereto.

It should be noted that any one of the accompanying drawings FIG. 8, FIG. 10, FIG. 12, and FIG. 14 is drawn based on FIG. 7. This application is not limited thereto. For example, in these embodiments, the radio link quality indicator may not be limited to be obtained based on the CSI-RS and the reference signal in the SS block. In addition, any two embodiments provided in the foregoing descriptions may be independent, or some or all features in a plurality of embodiments may be recombined to form a new embodiment, provided that the features do not conflict.

The foregoing mainly describes the solutions provided in the embodiments of this application from the perspective of the terminal. To implement the foregoing functions, the terminal includes a corresponding hardware structure and/or software module for performing each function. A person skilled in the art should be easily aware that with reference to the units and algorithm steps in the examples described in the embodiments disclosed in this specification, this application can be implemented by using hardware or a combination of hardware and computer software. Whether a function is performed by using hardware or hardware driven by computer software depends on specific applications and design constraints of the technical solutions. A person skilled in the art may use different methods to implement the described functions for each specific application, but it should not be considered that this implementation goes beyond the scope of this application.

In the embodiments of this application, the terminal may be divided into function modules based on the foregoing method examples. For example, each function module may be obtained through division based on each function, or two or more functions may be integrated into one processing module. The foregoing integrated module may be implemented in a form of hardware, or may be implemented in a form of a software function module. It should be noted that in the embodiments of this application, module division is an example, and is merely logical function division. In an actual implementation, another division manner may be used. The following describes an example in which each function module is obtained through division based on each corresponding function.

Figure 16:
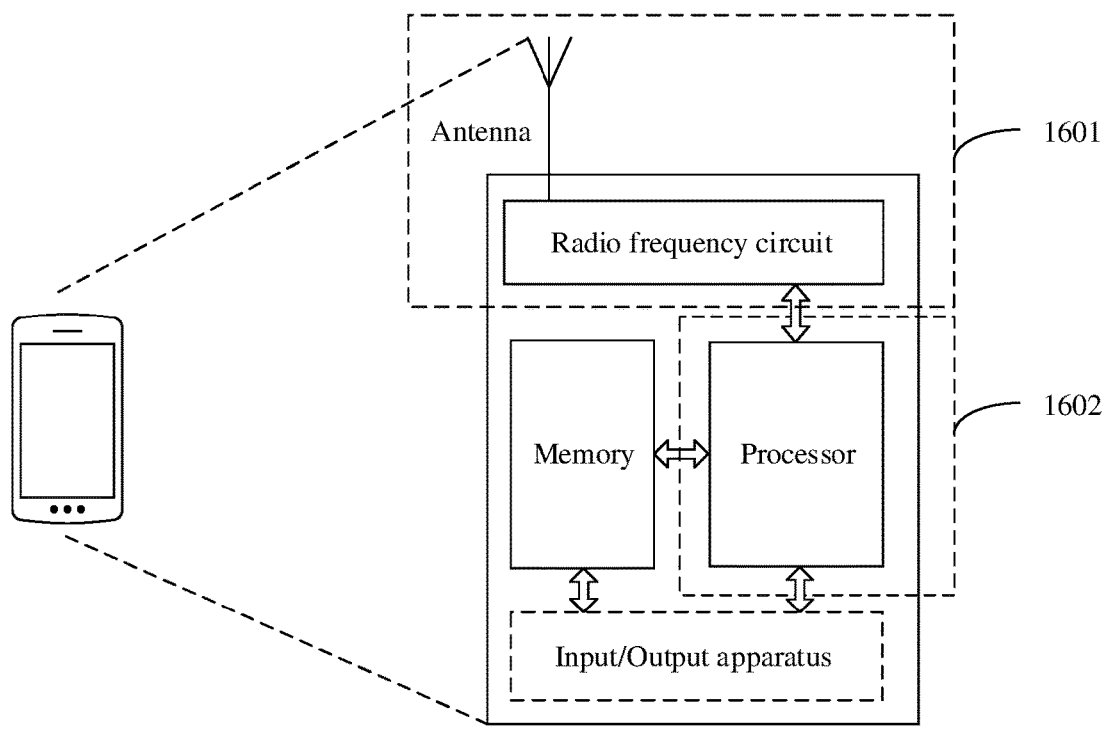
FIG. 16 is a schematic structural diagram of a radio link monitoring apparatus according to an embodiment of this application.

An embodiment of this application provides a radio link monitoring apparatus. The apparatus may be a chip (for example, a baseband chip or a communications chip), or may be a terminal. The apparatus may be configured to perform the radio link monitoring method shown in any one of the accompanying drawings FIG. 7, FIG. 8, FIG. 10, FIG. 12, and FIG. 14. The apparatus may be configured to perform any step in these accompanying drawings. The following uses an example in which the apparatus is a terminal for description. FIG. 16 is a simplified schematic structural diagram of a terminal. For ease of understanding and illustration, in FIG. 16, a mobile phone is used as an example of the terminal. As shown in FIG. 16, the terminal includes a processor, a memory, a radio frequency circuit, an antenna, and an input/output apparatus. The processor is mainly configured to: process a communication protocol and communication data, control the terminal, execute a software program, process data of a software program, and the like. The memory is mainly configured to store a software program and data. The radio frequency circuit is mainly configured to perform conversion between a baseband signal and a radio frequency signal and process the radio frequency signal. The antenna is mainly configured to receive and send a radio frequency signal in an electromagnetic wave form. The input/output apparatus, such as a touchscreen, a display screen, or a keyboard, is mainly configured to receive data entered by a user and output data to the user. It should be noted that some types of terminals may not have an input/output apparatus.

When data needs to be sent, after performing baseband processing on the to-be-sent data, the processor outputs a baseband signal to the radio frequency circuit. After performing radio frequency processing on the baseband signal, the radio frequency circuit sends a radio frequency signal in an electromagnetic wave form out through the antenna. When data is sent to the terminal, the radio frequency circuit receives a radio frequency signal through the antenna, converts the radio frequency signal into a baseband signal, and outputs the baseband signal to the processor. The processor converts the baseband signal into data, and processes the data. For ease of description, only one memory and one processor are shown in FIG. 16. An actual terminal product may have one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna that has receiving and sending functions and the radio frequency circuit may be considered as a transceiver unit of the terminal, and the processor that has a processing function may be considered as a processing unit of the terminal. As shown in FIG. 16, the terminal includes a transceiver unit 1601 and a processing unit 1602. The transceiver unit may also be referred to as a transceiver, a transceiver, a transceiver apparatus, or the like. The processing unit may also be referred to as a processor, a processing board, a processing module, a processing apparatus, or the like. Optionally, a component that is in the transceiver unit 1601 and that is configured to implement a receiving function may be considered as a receiving unit, and a component that is in the transceiver unit 1601 and that is configured to implement a sending function may be considered as a sending unit. In other words, the transceiver unit 1601 includes a receiving unit and a sending unit. The transceiver unit may also be sometimes referred to as a transceiver, a transceiver, a transceiver circuit, or the like. The receiving unit may also be sometimes referred to as a receiver, a receiver, a receiver circuit, or the like. The sending unit may also be sometimes referred to as a transmitter, a transmitter, a transmitter circuit, or the like.

For example, the processing unit 1602 may be configured to perform any step in any one of the accompanying drawings FIG. 7, FIG. 8, FIG. 10, FIG. 12, and FIG. 14.

For explanations and beneficial effects of related content in any apparatus provided above, refer to the corresponding method embodiments provided in the foregoing descriptions. Details are not described herein again.

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions. When the computer program instruction is loaded and executed on a computer, all or some of the procedures or functions described in the embodiments of this application are generated. The computer may be a general-purpose computer, a special-purpose computer, a computer network, or another programmable apparatus. The computer instruction may be stored in a computer readable storage medium, or may be transmitted from one computer readable storage medium to another computer readable storage medium. For example, the computer instruction may be transmitted from a website, a computer, a server, or a data center to another website, computer, server, or data center in a wired (for example, a coaxial cable, an optical fiber, or a digital subscriber line (DSL)) or wireless (for example, infrared, radio, or microwave) manner. The computer readable storage medium may be any available medium accessible to a computer, or a data storage device, for example, a server or a data center, integrating one or more available media. The available medium may be a magnetic medium (for example, a floppy disk, a hard disk, or a magnetic tape), an optical medium (for example, a DVD), a semiconductor medium (for example, a solid state disk (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a case of multiple. A single processor or another unit may implement one or more functions enumerated in the claims. Some measures are recorded in dependence claims that are different from each other, but this does not mean that these measures cannot be combined to produce a better effect.

Although this application is described with reference to specific features and the embodiments thereof, obviously, various modifications and combinations may be made to them without departing from the spirit and scope of this application. Correspondingly, the specification and accompanying drawings are merely example descriptions of this application defined by the appended claims, and are considered as any of or all modifications, variations, combinations, or equivalents that cover the scope of this application. Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method comprising:
   determining, by a lower layer of a terminal in a first duration, a first value of radio link quality of a radio link of the terminal and a second value of radio link quality of the radio link of the terminal, wherein the first value is obtained based on a channel state information-reference signal (CSI-RS), and the second value is obtained based on a reference signal in a downlink synchronization signal block (SS block); and
   sending, by the lower layer of the terminal, first indication information to a higher layer of the terminal upon determining that both the first value and the second value are less than or equal to a first threshold Qout, wherein the first indication information indicates that the radio link of the terminal is out of synchronization.

2. The method according to claim 1, wherein the second value comprises any one of following: an average of radio link quality of reference signals in a plurality of SS blocks in a time period, an average of radio link quality of reference signals in a plurality of SS blocks that have strongest RSRP in the time period, an average of radio link quality of a plurality of reference signals in SS blocks that have radio link quality exceeding a first threshold in the time period, or a value of best radio link quality in the time period; or
   the first value comprises any one of following: an average of radio link quality of a plurality of CSI-RSs in the time period, an average of radio link quality of a plurality of CSI-RSs that have best radio link quality in the time period, an average of radio link quality of a plurality of CSI-RSs that have radio link quality exceeding a second threshold in the time period, or a value of best radio link quality in the time period.

3. The method according to claim 2, wherein:
the time period is N SS burst set periods, N is an integer greater than or equal to 1, and one of the SS burst set periods comprises one or more SS blocks; or
the time period is N CSI-RS sending periods, and N is an integer greater than or equal to 1; or
the time period is a common multiple of one or more SS burst set periods and one or more CSI-RS sending periods.

4. The method according to claim 1, further comprising:
sending, by the lower layer of the terminal, second indication information to the higher layer of the terminal upon determining that either the first value or the second value is greater than or equal to a second threshold $Q_{in}$, wherein the second indication information indicates that the radio link recovers to be in synchronization.

5. An apparatus, wherein the apparatus comprises:
a non-transitory memory storage comprising instructions; and
one or more processors in communication with the memory storage, wherein the instructions, when executed by the one or more processors, cause the apparatus to:
determine, at a lower layer of the apparatus in a first duration, a first value of radio link quality of a radio link of the apparatus and a second value of radio link quality of the radio link of the apparatus, wherein the first value is obtained based on a channel state information-reference signal (CSI-RS), and the second value is obtained based on a reference signal in a downlink synchronization signal block (SS block); and
send, from the lower layer, first indication information to a higher layer upon determining that both the first value and the second value are less than or equal to a first threshold $Q_{out}$, wherein the first indication information indicates that the radio link is out of synchronization.

6. The apparatus according to claim 5, wherein
the second value comprises any one of following: an average of radio link quality of reference signals in a plurality of SS blocks in a time period, an average of radio link quality of reference signals in a plurality of SS blocks that have strongest RSRP in the time period, an average of radio link quality of a plurality of reference signals in SS blocks that have radio link quality exceeding a threshold in the time period, or a value of best radio link quality in the time period; or
the first value comprises any one of following: an average of radio link quality of a plurality of CSI-RSs in the time period, an average of radio link quality of a plurality of CSI-RSs that have best radio link quality in the time period, an average of radio link quality of a plurality of CSI-RSs that have radio link quality exceeding a threshold in the time period, or a value of best radio link quality in the time period.

7. The apparatus according to claim 6, wherein:
the time period is N SS burst set periods, N is an integer greater than or equal to 1, and one of the SS burst set periods comprises one or more SS blocks; or
the time period is N CSI-RS sending periods, and N is an integer greater than or equal to 1; or
the time period is a common multiple of one or more SS burst set periods and one or more CSI-RS sending periods.

8. The apparatus according to claim 5, wherein the instructions further cause the apparatus to:
send, from the lower layer, second indication information to the higher layer upon determining that either the first value or the second value is greater than or equal to a second threshold $Q_{in}$, wherein the second indication information indicates that the radio link recovers to be in synchronization.

9. A non-transitory computer-readable media storing computer instructions, that when executed by one or more processors, cause a terminal to perform:
determining, at a lower layer of the terminal, a first value of radio link quality of a radio link of the terminal and a second value of radio link quality of the radio link of the terminal, wherein the first value is obtained based on a channel state information-reference signal (CSI-RS), and the second value is obtained based on a reference signal in a downlink synchronization signal block (SS block); and
sending, from the lower layer of the terminal, first indication information to a higher layer of the terminal upon determining that both the first value and the second value are less than or equal to a first threshold $Q_{out}$, wherein the first indication information indicates that the radio link of the terminal is out of synchronization.

10. The non-transitory computer-readable media according to claim 9, the instructions further cause the terminal to perform:
sending, by the lower layer of the terminal, second indication information to the higher layer of the terminal upon determining that either the first value or the second value is greater than or equal to a second threshold $Q_{in}$, wherein the second indication information indicates that the radio link recovers to be in synchronization.

* * * * *